Patented Apr. 24, 1945

2,374,547

UNITED STATES PATENT OFFICE 2,374,547

MANUFACTURE OF CELLULOSE ESTERS

Bayard T. Lamborn, Matawan, N. J., assignor to Hercules Powder Company, Wilmington, Del., a corporation of Delaware No Drawing. Application October 22, 1942, Serial No. 462,961

11 Claims. (Cl. 260—225)

The present invention relates to a process of preparing cellulose esters and more particularly to a process for preparing cellulose esters in which certain metallic salt solutions are used to precipitate the cellulose esters.

In the preparation of fatty acid esters of cellulose the acylation action takes place between cellulose, one or more anhydrides of fatty acids, one or more fatty acids or other organic solvents and one or more catalysts. The esterification is allowed to take place at increased temperature usually for several hours and when the acylation is complete water may be added to hydrolize the ester to any desired degree of esterification. The catalyst, which is usually sulfuric acid, is neutralized. Subsequently, a large amount of water, acid solution, or organic nonsolvent is added to precipitate the esters.

Difficulty has been encountered by the use of water or aqueous solutions of organic acids as precipitating agents. The cellulose mixed esters, for instance, apparently functioned in part as a partitioning agent, particularly in respect to the higher organic free acid and either a very large volume of precipitant was required or the higher acids had to be extracted by a process of partial precipitation and resolution of the mixed esters in acetic acid or other solvent. Either method was objectionable because the physical form of the precipitate was such as to prevent good purification and a large quantity of spent acids had to be rectified.

It is desirable that the manufacture of cellulose esters be simplified and produce a product with a particle which has a physical form which is fibrous, porous, and "open" permitting easy purification, in contrast to the dense, tough particle obtained with a water or aqueous acid precipitation.

Now in accordance with the present invention it has been found that by treating the acylation dope with an aqueous solution of a lower fatty acid salt of a colorless cation such as ammonium, magnesium, potassium or sodium, a precipitate is formed having these desirable properties. The salts are used in 10% or higher concentrations with at least one third of a unit of precipitating solution to one unit of dope. The invention has been found to be particularly applicable to cellulose acetate, cellulose acetate butyrate, cellulose acetate caproate and in each case the physical form of the particle was fibrous, porous and "open."

The following are examples of method of carrying out the process:

Example 1

A quantity of cellulose acetate butyrate dope was made from ingredients in the following proportions:

| | Parts by weight |
|---|---|
| Cellulose | 1.0 |
| Acetic acid | 0.4 |
| Butyric anhydride | 3.7 |
| Acetic anhydride | 0.6 |
| Methylene chloride | 2.7 |
| Sulfuric acid | .02 |

The usual esterification was allowed to take place, .64 part of water was added, the material hydrolyzed to the desired extent, and the sulfuric acid neutralized.

One unit volume of the cellulose acetate butyrate dope was mixed with one unit volume of 32% sodium acetate solution. The ester precipitated immediately in a satisfactory physical form.

Example 2

One unit volume of cellulose acetate butyrate dope as in Example 1 was mixed with one unit volume of 16% sodium acetate. Precipitation took place more slowly than Example 1 but the physical form of the precipitation was satisfactory.

Example 3

One unit volume of cellulose acetate butyrate dope as in Example 1 was mixed with one unit volume of 43% magnesium acetate solution. The ester precipitated immediately in a satisfactory physical form.

Example 4

One unit volume of cellulose acetate butyrate dope as in Example 1 was mixed with one unit volume of 30% ammonium acetate solution. The esters precipitated immediately and were of a satisfactory physical form.

Example 5

One unit volume of cellulose acetate butyrate dope as in Example 1 was mixed with one unit volume of 16% potassium acetate. The ester started to precipitate in a rather dense mass. One half unit volume of a 32% potassium acetate solution was added and this caused immediate precipitation in the desirable "open" form.

Example 6

A cellulose acetate caproate dope was prepared from the following ingredients:

| | Parts by weight |
|---|---|
| Cellulose | 1.0 |
| Acetic acid | 0.4 |
| Caproic acid | 3.4 |
| Acetic anhydride | 3.0 |
| Methylene chloride | 1.8 |
| Sulfuric acid | .05 |

After the esterification was complete 1.07 parts of water were added and hydrolysis allowed to take place. The sulfuric acid was then neutralized by the addition of .30 part of ammonia acetate solution.

Precipitation was effected with a 30% ammonium acetate solution in the ratio of four parts of the dope to three parts precipitant. The precipitation took place rapidly and the product was satisfactory.

Example 7

A cellulose acetate dope was prepared with the following ingredients:

| | Parts by weight |
|---|---|
| Cellulose | 1.0 |
| Acetic acid | 3.8 |
| Acetic anhydride | 3.0 |
| Methylene chloride | 1.8 |
| Sulfuric acid | .05 |

When esterification was complete, 1.0 part of water was added and hydrolysis allowed to take place. The sulfuric acid was neutralized with .30 part of ammonium acetate.

Precipitation was carried out with a 32% sodium acetate solution in the proportion of one volume of dope to 0.42 volume of precipitant. The particles of the ester were highly extended and almost non-fibrous. On drying, the acetate shrank to about half its wet volume. The bulk density of the dry material was about 0.5 gram per cc. as compared to about 0.3 gram per cc. normally and was wet quickly and uniformly with solvents.

Example 8

Ten parts of cellulose acetate dope prepared as in Example 7 were heated to 45° C. and the ester was precipitated with 4 parts of a 32% sodium acetate solution. The ester was of good stability and after drying and pulverizing had a bulk density of about 0.5 gram per cc. and was readily wet with solvents.

Example 9

Eight hundred grams of cotton linters were pretreated with 307 cc. of acetic acid and the esterification reaction was carried out in the usual manner in a bath at 30° C. comprising 3050 cc. butyric anhydride, 445 cc. acetic anhydride, 1610 cc. methylene chloride and 8.7 cc. of sulfuric acid. When the esterification was complete the reaction was stopped with 510 cc. of water and the catalyst neutralized. The material was precipitated with half its volume of 30% ammonium acetate solution. On washing and drying it showed good heat stability and color after heating.

While in the examples the acetate salts of sodium, potassium, magnesium and ammonium have been given as illustrating the precipitants, it is possible to use any of the lower fatty acid salts of colorless cations such as ammonium, magnesium, potassium and acetic, propionic, butyric, etc., acids. Salts of inorganic acids such as sulfuric have not been found effective. Of these salts, magnesium and ammonium acetate have been found to be most desirable as precipitants.

The concentration of the salt solution used for precipitation may vary over a wide range but a minimum of about 10% concentration in solution is necessary to get a reasonably good precipitation having the desirable qualities of producing a particle which is fibrous, porous and "open." A salt concentration of about 30% has been found most desirable. The amount of the salt solution used may be varied but at least an amount equivalent to one-third of the volume of dope is necessary to get a reasonably good and speedy precipitation. An amount of salt solution just about equal to the amount of dope has been found most desirable.

This invention has been found advantageous in the precipitation of the lower fatty acid esters of cellulose. These esters include cellulose acetate, cellulose propionate, cellulose butyrate, and the mixed esters such as cellulose acetate propionate, cellulose acetate butyrate, cellulose acetate stearate, etc.

The neutralization of the sulfuric acid catalyst may be carried out by any of the well-known methods including the use of the acetic salts of sodium, potassium, etc.

Thus, the present invention has described a process for the manufacture of cellulose esters which, by the use of the lower fatty acid salts of colorless cations in solution as precipitants will yield a particle the physical form of which is fibrous, porous, and "open" as well as color stable toward heat.

What I claim and desire to protect by Letters Patent is:

1. In the manufacture of the lower fatty acid esters of cellulose the step of precipitating said esters from the acylation dope comprising adding at least a 10% aqueous solution of a lower fatty acid salt of a colorless cation in an amount at least equivalent to one third of the volume of the acylation dope.

2. In the manufacture of mixed fatty acid esters of cellulose the step of precipitating said esters from the acylation dope comprising adding at least a 10% aqueous solution of a lower fatty acid salt of a colorless cation in an amount at least equivalent to one third of the volume of the acylation dope.

3. In the manufacture of cellulose acetate the step of precipitating the acetate from the acetylation dope comprising adding at least a 10% aqueous solution of a lower fatty acid salt of a colorless cation in an amount at least equivalent to one third of the volume of the acetylation dope.

4. In the manufacture of a lower fatty acid ester of cellulose the step of precipitating the ester from the acylation dope comprising adding at least a 10% aqueous solution of a lower fatty acid salt of a colorless cation in an amount at least equivalent to one third of the volume of the acylation dope.

5. In the manufacture of a lower fatty acid ester of cellulose the step of precipitating the ester from the acylation dope comprising adding at least a 10% aqueous solution of magnesium acetate in an amount at least equivalent to one third of the volume of the acylation dope.

6. In the manufacture of a lower fatty acid ester of cellulose the step of precipitating the ester from the acylation dope comprising adding at least a 10% aqueous solution of ammonium acetate in an amount at least equivalent to one third of the volume of the acylation dope.

7. In the manufacture of a lower fatty acid ester of cellulose the step of precipitating the ester from the acylation dope comprising adding at least a 10% aqueous solution of a lower fatty acid salt of a colorless cation in an amount substantially equal to the volume of the acylation dope.

8. A method for the manufacture of a lower fatty acid ester of cellulose comprising reacting cellulose with at least one lower fatty acid anhydride in the presence of sulfuric acid as a catalyst, subsequently precipitating the cellulose ester thus formed by adding at least a 10% aqueous solution of a lower fatty acid salt of a colorless cation in an amount at least equivalent to one third of the volume of the acylation dope.

9. The manufacture of a lower fatty acid ester of cellulose comprising reacting cellulose with at least one lower fatty acid and at least one lower fatty acid anhydride in the presence of sulfuric acid as a catalyst, subsequently neutralizing the sulfuric acid and precipitating the ester thus formed by adding at least a 10% aqueous solution of a lower fatty acid salt of a colorless cation in an amount at least equivalent to one third of the volume of the acylation dope.

10. In the manufacture of a lower fatty acid ester of cellulose the step of precipitating the ester from the acylation dope with at least a 10% solution of sodium acetate in an amount at least equivalent to one third of the volume of the acylation dope.

11. In the manufacture of a lower fatty acid ester of cellulose the step of precipitating the ester from the acylation dope with about a 30% aqueous solution of a lower fatty acid salt of a colorless cation in an amount at least equivalent to one third of the volume of the acylation dope.

BAYARD T. LAMBORN.